Patented May 6, 1952

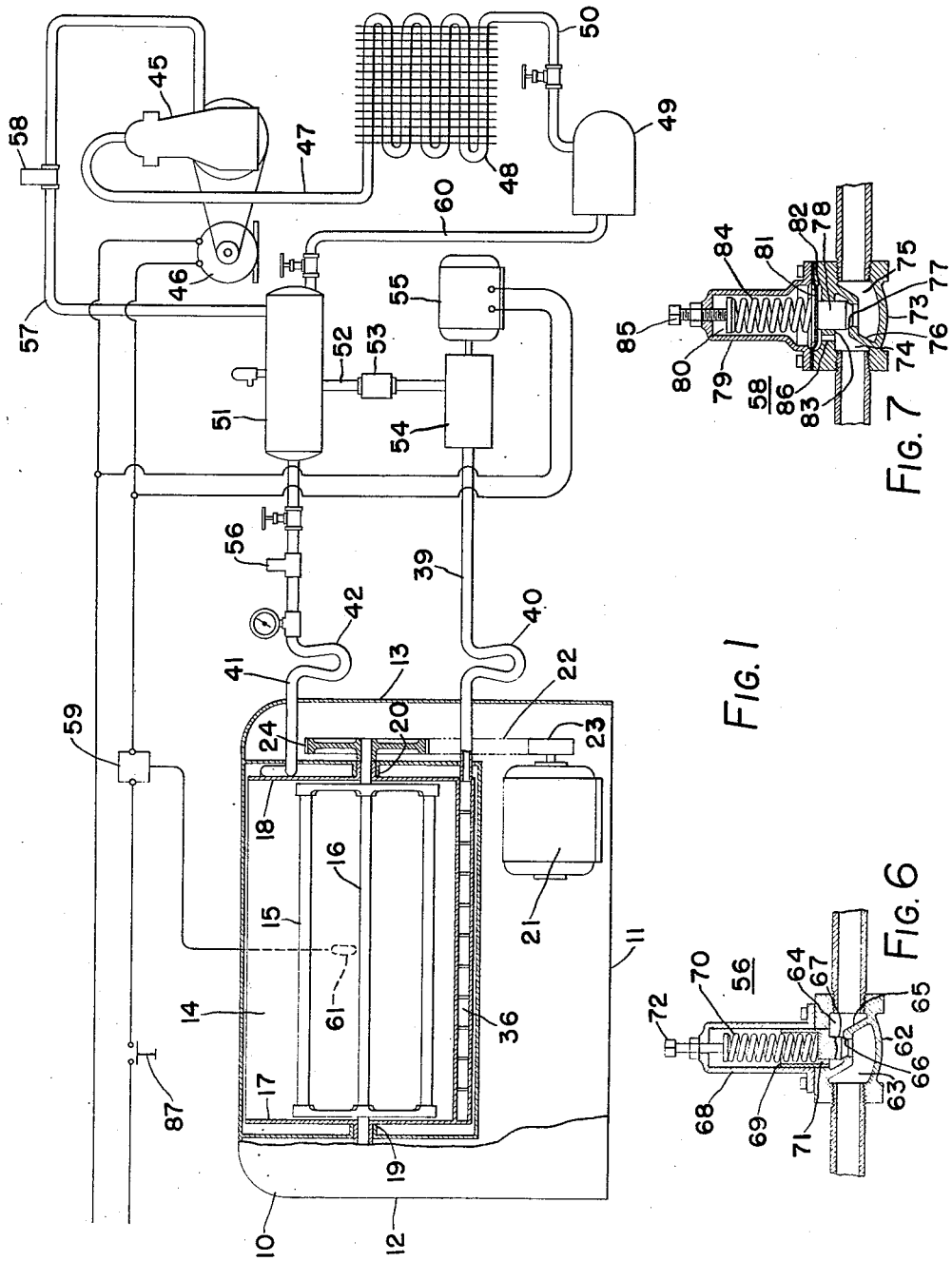

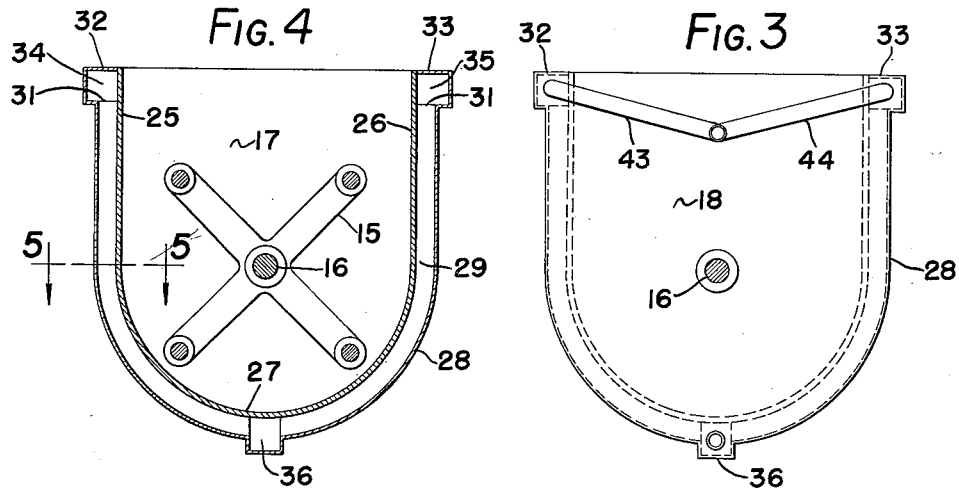
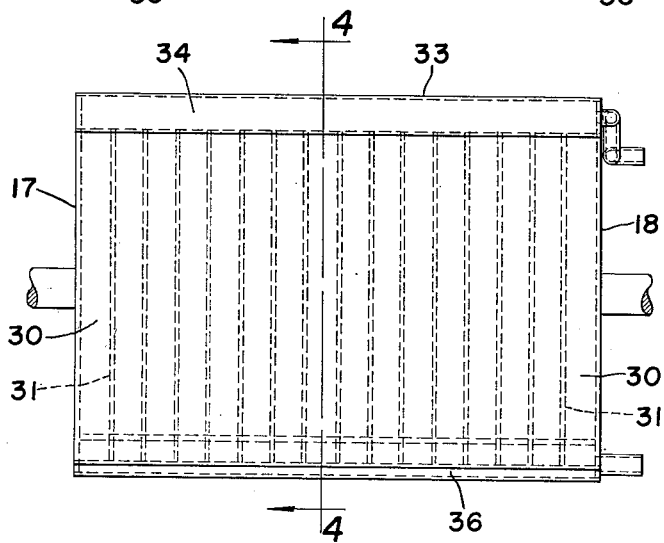
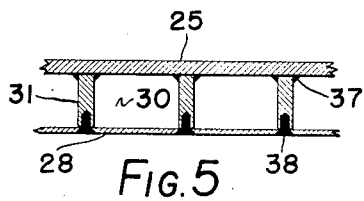

2,595,298

UNITED STATES PATENT OFFICE 2,595,298

REFRIGERATED DOUGH MIXER

Alonzo W. Ruff, York, Pa., assignor to Read Standard Corporation, a corporation of Delaware Application March 31, 1949, Serial No. 84,517

6 Claims. (Cl. 62—4)

My invention relates to dough mixers, and more particularly to horizontal dough mixers provided with cooling means for maintaining a desired predetermined temperature within the mixer chamber.

In order to obtain bread of desired high quality, it is important that the mixing of the dough be carried out to the extent of effecting fullest development of the gluten content of the flour. It is well known that mixing of the dough, particularly in the later stages, is accompanied by generation of heat which, if not dissipated, effects the quality of the bread. Various means have heretofore been proposed and used to effect cooling of the contents of the dough mixer including circulation of refrigerated brine through the mixer jacket, and direct expansion of a refrigerant in the mixer jacket. In some instances these and other known systems are not entirely suitable or desirable and it is an object of my invention to provide novel and improved means for cooling the contents of a dough mixer.

Another object of the invention is to provide means for producing bread dough in a mixer at a predetermined temperature, including a volatile refrigerant arranged for circulation in liquid form to maintain a substantially fixed predetermined temperature throughout a jacket that encloses the wall of the mixer chamber and in which the liquid refrigerant is in direct heat transfer relation with the said wall.

Another object of the invention is to provide dough cooling means of the type described wherein a single refrigerating system serves to supply liquid refrigerant to a plurality of mixer jackets arranged and constructed to permit independent or simultaneous operation of the mixers with independent cooling control for meeting the individual cooling requirements of each mixer.

Another object of the invention is to provide a novel jacketed mixer chamber for circulation of a liquid refrigerant that provides a large and effective cooling surface, that is simple in construction and is conveniently manufactured and assembled.

In accordance with my invention, liquid refrigerant passes from a distributing manifold located at the bottom of the mixer jacket upwardly through passages in both sides of the mixer jacket to headers at the upper ends of said sides, from which the liquid is returned through a pressure differential valve to a surge tank, where liquid and gaseous refrigerant are separated. The gaseous refrigerant passes to a compressor and the compressed refrigerant gas after circulating through a condenser is received in a liquid refrigerant receiving chamber. A float controlled valve admits liquid refrigerant at reduced pressure to a line leading to the surge chamber, and a liquid circulating pump interposed in a line leading from the surge tank to the distributing manifold of the mixer jacket maintains a pressure on the liquid refrigerant in the mixer jacket sufficient to preclude any substantial evaporation or boiling thereof. The temperature and pressure of the liquid refrigerant is such that it absorbs sensible heat from the mixing chamber of the mixer without boiling of the refrigerant.

Because of the proximity of the bottom and lower sides of the jacket to the point of introduction of the refrigerant liquid, the temperature of the refrigerant liquid will be lowest in those parts of the jacket where the dough is most active during the mixing, thereby assuring greater efficiency. Effective refrigeration throughout the mixer jacket with a minimum of baffling is insured, since if circulation of refrigerant liquid through any of the vertical mixer jacket passages is impeded, the temperature of the refrigerant liquid therein will only rise a few degrees before evaporating and thus produce cooling work.

The above and other objects and advantages of the invention will become apparent in the course of the following description, illustrated by the accompanying drawings, in which—

Figure 1 is a vertical longitudinal central sectional view through a horizontal mixer with parts shown in elevation, embodying the novel mixer bowl, and with the refrigerating system for the jacket of the mixer bowl shown diagrammatically;

Figure 2 is an enlarged view in side elevation of the novel mixer bowl;

Figure 3 is an end view of the mixer bowl showing the pipe connection to the bowl jacket manifolds;

Figure 4 is a sectional view taken on the line 4—4 of Figure 2;

Figure 5 is an enlarged sectional view taken on the line 5—5 of Figure 4 showing a preferred construction of the mixer bowl jacket;

Figure 6 is a sectional view through the pressure differential valve of the refrigerating system;

Figure 7 is a sectional view through the suction pressure regulating valve of the refrigerating system.

Figure 8:
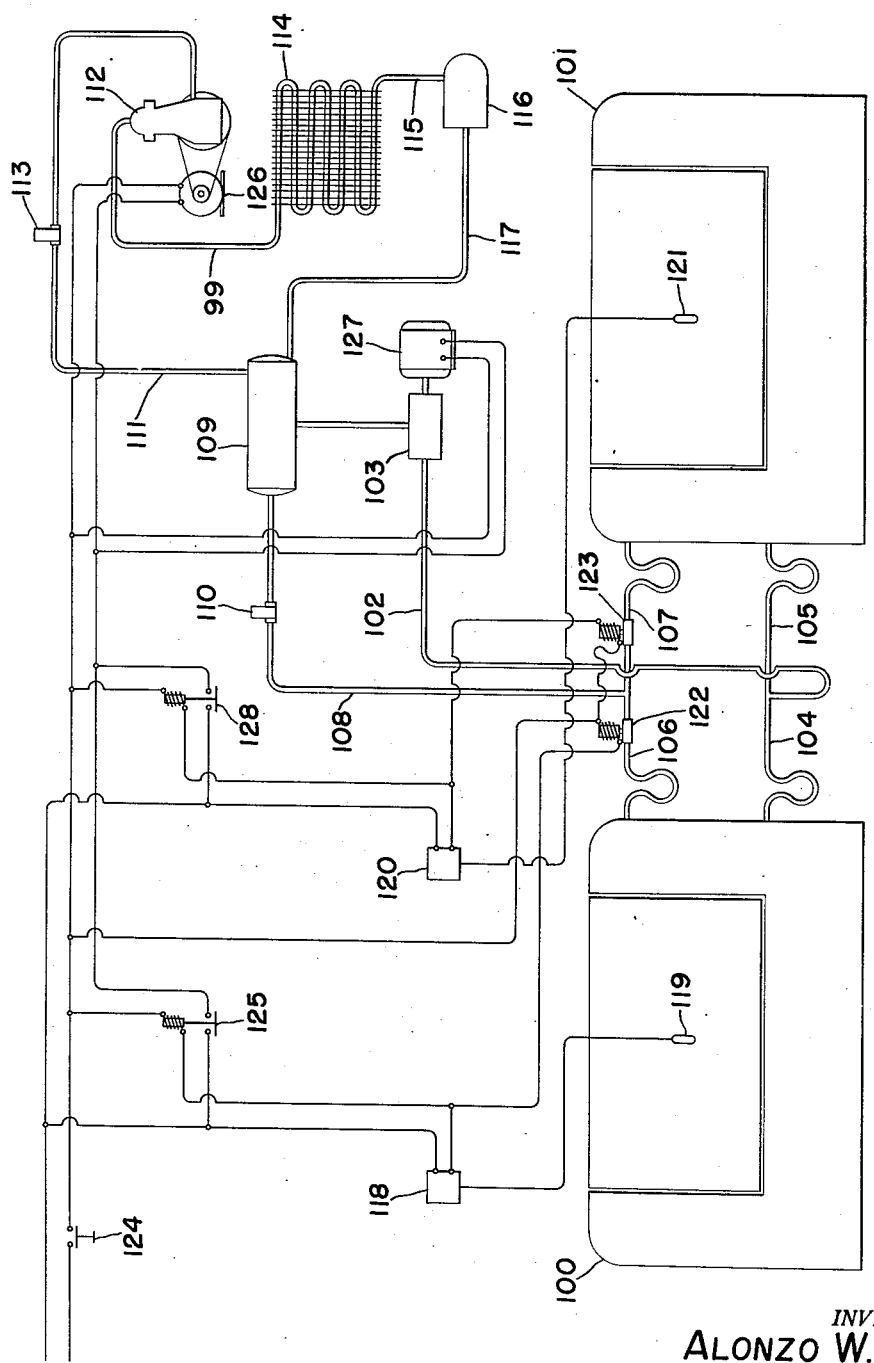
Figure 8 is a diagrammatic view of a modified form of the invention showing an arrangement for refrigerating the jackets of a pair of mixers.

Referring particularly to Figure 1 of the drawings, the reference character 10 designates a horizontal type dough mixer having a base 11 from which rise left and right hand columns 12 and 13. Between the columns 12 and 13 and above the base 11 is a tiltably mounted mixing bowl or receptacle 14.

Within the bowl 14 is an agitator 15 fixed on a rotatable shaft 16 that extends through the end walls 17 and 18 of the bowl 14 and is mounted in suitable bearing means 19 and 20. The agitator 15 is operated by the motor 21 through any suitable means, such as a chain 22 trained over the sprockets 23 and 24.

The bowl 14, as best shown in Figure 4, is substantially U-shaped in transverse cross section comprising upright side walls 25 and 26, and a semi-circular bottom wall 27, formed with or having a fluid tight connection at their ends with the end walls 17 and 18. The side walls 25 and 26, and the bottom wall 27 constitute a metallic heat transfer surface which is enclosed by a jacket or shell 28 that provides a fluid tight chamber 29 for a liquid refrigerant.

The chamber 29 is divided into a plurality of side by side upwardly extending passages 30 by the partitions or baffles 31 as best shown in Figure 2. The partitions 31 terminate at their upper ends short of the top walls 32 and 33 of the refrigerant chamber 29 to form longitudinally extending headers 34 and 35 and terminate at their lower ends to form a longitudinal header 36 in the bottom of the refrigerant chamber 29. In one preferred method of forming the partitioned jacketed mixer bowl, the partitions 31 are tack welded to the mixer wall as shown at 37 in Figure 5, and the jacket 28 is secured to the partitions 31 by plug welds 38.

All the passages 30 communicate with the bottom header 36 to receive liquid refrigerant therefrom and the passages 30 on one side of the mixer communicate with top header 35 to deliver refrigerant thereto while the passages 30 on the other side of the mixer communicate with top header 34 to deliver refrigerant thereto.

Referring again to Figure 1, a refrigerant delivery pipe 39, provided with a flexible section 40 to permit tilting movement of the mixer bowl 14, communicates with the header 36. A refrigerant discharge pipe 41, provided with a flexible section 42 to permit tilting movement of the mixer bowl 14, communicates with the headers 34 and 35 through the branching discharge pipes 43 and 44, best shown in Figure 3.

While any refrigerant having a low boiling point may be employed in my refrigerating system, I preferably use Freon (dichlorodifluoromethane). The refrigerating system comprises a compressor 45 driven from an electric motor 46 for compressing the gaseous refrigerant. A conduit 47 conducts the compressed gaseous refrigerant to a condenser 48, this portion of the refrigerant circuit being known as the high pressure gas side, and from the condenser 48 the now liquified refrigerant is conducted to the liquid receiver 49 through conduit 50, this portion of the refrigerant circuit being known as the high pressure liquid side.

Accumulation of liquid refrigerant in the liquid receiver 49 beyond a predetermined level effects opening of a conventional float valve (not shown) allowing liquid refrigerant to enter the low pressure liquid side of the refrigerant circuit. Conduit 60 delivers low pressure liquid refrigerant and gas formed by expansion to the surge drum 51 where gas and liquid are separated. The amount of gas formed when the liquid refrigerant passes through the float valve is that required to cool the remaining liquid to a temperature corresponding to the temperature and pressure conditions in the surge drum 51. From the surge drum 51 liquid refrigerant is pumped by means of a pump 54, operated by an electric motor 55, through conduit 52, which preferably has a strainer 53 interposed therein, into the refrigerant delivery pipe 39.

The refrigerant discharge pipe 41 leads to the surge drum 51, and interposed in the pipe 41 is a pressure differential valve 56. The purpose of the pressure differential valve 56 is to set up a pressure against the pump 54 discharge so as to prevent vaporization of liquid refrigerant in the refrigerant chamber 29 of the mixer. This pressure setting is adjusted sufficiently high so that the sensible heat picked up does not raise the liquid refrigerant temperature above its corresponding evaporating pressure, thereby preventing vaporization of the liquid refrigerant.

The pressure differential valve 56 may be of any suitable construction, and a preferred form of valve is shown in Figure 6. The valve 56 comprises a valve body 62 having an inlet 63 and a discharge 64 separated by a wall 65 which is formed with a passage defining a valve seat 66 for the valve member 67. The valve body is provided with a cylindrical bonnet 68 forming a guide for the valve stem 69 of valve member 67. Within the bonnet 68 is a spring 70 bearing against the valve stem 69 urging the valve member 67 against its seat 66. An equalizing port 71 in the valve stem 69 provides for admitting pressure to and venting pressure from the space in the bonnet 68 above the valve stem 69. The degree of compression of spring 70 thus determines the differential in pressure between the inlet 63 and the discharge 64 of the pressure differential valve 56. An adjusting screw 72 is provided for adjusting the compression of spring 70 to obtain a desired pressure differential on opposite sides of valve 56.

After passing the pressure differential valve 56, a part of the liquid flashes into vapor and the remainder is cooled down to a temperature corresponding to the pressure in drum 51. The gas and liquid are separated in the surge drum 51 and the refrigerant gas is withdrawn through the low pressure gas line 57 into the compressor 45, where it is again compressed and the cycle as described above is repeated. A suction pressure regulating valve 58 is interposed in the line 57 which establishes the pressure in the surge drum 51 and consequently the temperature of the liquid refrigerant in drum 51 and that delivered to the refrigerant chamber 29 of the mixer by the pump 54. The suction pressure regulating valve 58 may be adjusted to obtain a desired refrigerant liquid temperature to suit the particular conditions of use.

The valve 58 may be of any suitable construction, a preferred form being shown in Figure 7. The valve 58 comprises a valve body 73 having an inlet 74 and a discharge 75 separated by a wall 76 which is formed with a passage defining a valve seat 77 for the valve member 78. A cap 79 having a chamber 80 formed therein is mounted on the valve body 73 and a diaphragm 81 between the cap 79 and valve body 73 separates the chamber 80 from the chamber 82 that is formed in the upper part of the valve body 73 by the wall 83. The wall 83 is provided with a passage forming a guide for the upper end of the valve member 78. The valve member 78 is suitably secured to the diaphragm 81 so that its movement toward and away from its seat 77 is controlled by the diaphragm 81. A spring 84 in the cap 79 exerts a desired pressure on the diaphragm 81 and an adjusting screw 85 provides for adjustment of the pressure on the diaphragm. A port 86 in the wall 83 provides communication between the inlet 74 of the valve body 73 and the chamber 82.

The current for operating the compressor motor 46 and the pump motor 55 is under control of a switch 59, which includes an automatic thermostatic control on the mixer jacket 28, as indicated in Figure 1 by reference character 61. When cooling is satisfied, the pump motor 55 and compressor motor 46 are automatically cut out of operation and when refrigeration is called for again, the pump motor 55 and compressor motor 46 are automatically placed in operation. A manually operated electric switch 87 is preferably provided whereby the operator may discontinue refrigeration at will. If such a switch is employed, the automatic thermal control 61 takes over only when refrigeration is called for by the mixer jacket temperature and when the manually operated switch 87 has been closed.

When the system is shut down the mixer chamber 29 is completely emptied of refrigerant since the pressure differential valve 56 closes; and inasmuch as the pump 54 has stopped, pressure is reduced in the chamber 29 which results in immediate flashing of some of the liquid into vapor and pushing the remaining liquid backwards through the pump 54 and back into the surge drum 51. This prevents over-cooling and insures safety since the mixer bowl 14 can be cleaned with hot water without interposing excessive pressure as long as the surge drum 51 is kept in a cooler position.

Referring now to Figure 8, there is shown a modification of the invention wherein a single refrigeration system of the type described above may be employed with a plurality of mixers. A pair of mixers, similar in all respects with the mixer 10 previously described, are indicated by the reference characters 100 and 101.

The liquid refrigerant delivery pipe 102 leading from the pump 103 is branched with one branch pipe 104 supplying mixer 100 and the other branch pipe 105 supplying mixer 101. Liquid refrigerant discharge pipe 106 leading from mixer 100 and liquid refrigerant discharge pipe 107 leading from mixer 101 communicate with the single discharge pipe 108 that leads to the surge drum 109. Interposed in the liquid refrigerant discharge pipe 108 is a pressure differential valve 110, similar in all respects with the valve 56 of the first described form of the invention.

From the surge drum 109, the separated gaseous refrigerant is drawn through low pressure gas pipe 111 into the compressor 112. Interposed in the pipe 111 is a suction pressure regulating valve 113, similar in all respects with the valve 58 of the first described form of the invention. The compressed gaseous refrigerant passes from the compressor 112 through the high pressure gas pipe 99 to the condenser 114, thence through high pressure liquid refrigerant pipe 115 to the liquid receiver 116. A conventional float valve (not shown) associated with the liquid receiver admits liquid refrigerant at a lower pressure to the pipe 117, through which it is delivered to the surge drum 109.

Each of the mixers 100 and 101 is provided with a thermostatic control for effecting operation of the compressor 112 and pump 103 when refrigeration is required and for interrupting operation of the compressor and pump when refrigeration is satisfied. Mixer 100 is provided with switch 118 controlled by thermostatic element 119 and mixer 101 is provided with switch 120 controlled by thermostatic element 121.

Switch 118 controls a normally closed solenoid operated valve 122 in the refrigerant discharge pipe 106 of mixer 100 and switch 120 controls a normally closed solenoid operated valve 123 in the refrigerant discharge pipe 107 of mixer 101, whereby refrigeration of the mixers 100 and 101 is satisfied in accordance with their respective requirements. The automatic thermal controls take over only when refrigeration is called for by one or the other of the mixers 100 and 101 and when manually operated switch 124 has been closed.

In operation, assuming that switch 124 is closed and that the temperature of mixer 100 rises to the point where refrigeration is required, then the thermostatic element 119 effects closing of switch 118. With switch 118 closed, a circuit through the solenoid that operates switch 125 is closed, whereupon switch 125 closes and completes a circuit to the compressor motor 126 and the pump motor 127. At the same time a circuit through the solenoid that operates valve 122 is closed, causing valve 122 to open. Refrigerant liquid will then circulate through the mixer 100 and the operation of the refrigerating system is just as described above in the first form of the invention. However, valve 123 remains closed, and since there is consequently no circulation of refrigerant liquid through mixer 101, no cooling is effected.

When refrigeration of mixer 101 is called for, thermostatic element 121 effects closing of switch 120, thereby completing a circuit to the solenoid of valve 123, whereupon valve 123 opens and circulation of refrigerant liquid takes place. Assuming now, that refrigeration of mixer 100 is satisfied, then switch 118 opens, thereby breaking the circuit to the solenoid of valve 122 and causing valve 122 to close. Circulation of refrigerant liquid through mixer is then interrupted. At the same time the circuit to the solenoid of switch 125 is broken, causing switch 125 to open. The compressor motor 126 and pump motor 127 will, however, continue to operate since the circuit is completed through solenoid operated switch 128, through the thermally controlled switch 120 of mixer 101.

When refrigeration in both mixers is satisfied, switches 118 and 120 will both be open, whereupon the circuits to the solenoids of both the switches 125 and 128 are broken, causing them to open and thereby breaking both circuits to the compressor motor 126 and the pump motor 127.

It is apparent then, that the refrigeration requirements of the mixers 100 and 101 may be satisfied independently of each other.

I claim:

1. In a dough mixer, a mixing receptacle, said receptacle being defined by a wall, means for cooling said wall comprising a refrigerant chamber in direct heat transfer relation to said wall, said chamber forming a part of the liquid line of a flooded expansion refrigerating system, means for maintaining refrigerant in said chamber at a pressure above that at which it would boil, and thermal control means responsive to a predetermined refrigerant temperature for effecting operation of said refrigerating system.

2. In a dough mixer, a mixing receptacle, said receptacle being defined by a wall, means for cooling said wall comprising a refrigerant chamber in direct heat transfer relation to said wall, said chamber forming a part of the liquid line of a flooded expansion refrigerating system, means for maintaining refrigerant in said chamber at a pressure above that corresponding to the boiling point at the working temperature of the receptacle wall, and thermal means responsive to a predetermined temperature range for controlling the operation of said refrigerating system.

3. In a dough mixer, a mixing receptacle, said receptacle being defined by a wall, means for cooling said wall comprising a refrigerant chamber in direct heat transfer relation to said wall, said chamber forming a part of the liquid line of a flooded expansion refrigerating system, a refrigerant supply line leading to said chamber, a refrigerant return line leading from said chamber, a pressure differential valve in said refrigerant return line, and means in said supply line for subjecting the refrigerant in said chamber to pressure for inhibiting vaporization thereof.

4. In a dough mixer, a mixing receptacle, said receptacle being defined by a wall, means for cooling said wall comprising a refrigerant chamber in direct heat transfer relation to said wall, a flooded refrigerant system including an expansion tank for liquid refrigerant, a supply line and pump for delivering liquid refrigerant from said tank to said chamber, a refrigerant return line from said chamber to said tank, a pressure differential valve in said return line adapted to set up a sufficient pressure against said pump discharge to maintain the refrigerant in said chamber in liquid state, and thermal control means for setting said refrigerant system in operation when the liquid refrigerant in said chamber approaches its evaporating temperature.

5. In a cooling system for a plurality of dough mixers, a mixing receptacle for each mixer, each of said mixing receptacles being defined by a wall, means for cooling said walls comprising a refrigerant chamber for each of said walls in direct heat transfer relation therewith, said chambers forming a part of the liquid line of a closed circuit flooded expansion refrigerating system, means for maintaining refrigerant in said chambers at a pressure above that corresponding to the boiling point at the working temperature of the receptacle walls, a valve at the liquid refrigerant discharge side of each of said chambers for independently controlling circulation of refrigerant through said chambers and thermal control means for each of said chambers for controlling the operation of a respective valve and the operation of said refrigerating system.

6. Cooling means for a plurality of dough mixers, each mixer being provided with a jacketed mixing receptacle, a flooded expansion refrigerating system including an expansion tank for liquid refrigerant, conduit means for supplying liquid refrigerant from said tank to each of said jackets, conduit means for returning refrigerant from said jackets to said tank including branch conduits leading from each of said jackets and a trunk conduit connecting said branch conduits with the tank, pumping means in said refrigerant supply conduit, a pressure differential valve in said trunk return conduit adapted to set up a sufficient pressure against said pump discharge to maintain the refrigerant in said jackets in liquid state, a valve in each of said branch return conduits for independently controlling circulation of refrigerant through said jackets, and thermal control means for each of said jackets for controlling the operation of a respective last named valve.

ALONZO W. RUFF.

REFERENCES CITED

The following references are of record in the file of this patent:

UNITED STATES PATENTS

| Number | Name | Date |
| --- | --- | --- |
| 1,703,351 | Molesworth | Feb. 26, 1929 |
| 1,718,312 | Shipley | June 25, 1929 |
| 1,866,992 | Zieber | July 12, 1932 |
| 2,109,199 | Koerner | Feb. 22, 1938 |
| 2,274,220 | Sticelber | Feb. 24, 1942 |
| 2,315,230 | Sticelber | Mar. 30, 1943 |
| 2,461,450 | Sticelber | Feb. 8, 1949 |